US012116701B2

(12) United States Patent
Firgo et al.

(10) Patent No.: US 12,116,701 B2
(45) Date of Patent: Oct. 15, 2024

(54) FLAME RETARDANT CELLULOSIC MAN-MADE FIBERS

(71) Applicant: LENZING AG, Lenzing (AT)

(72) Inventors: Heinrich Firgo, Vöcklabruck (AT); Clemens Bisjak, Seewalchen (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 655 days.

(21) Appl. No.: 16/758,317

(22) PCT Filed: Oct. 25, 2018

(86) PCT No.: PCT/EP2018/079227
§ 371 (c)(1),
(2) Date: Apr. 22, 2020

(87) PCT Pub. No.: WO2019/081617
PCT Pub. Date: May 2, 2019

(65) Prior Publication Data

US 2020/0340143 A1 Oct. 29, 2020

(30) Foreign Application Priority Data

Oct. 27, 2017 (EP) .................................... 17198949

(51) Int. Cl.
*D01F 1/07* (2006.01)
*B01F 25/23* (2022.01)
(Continued)

(52) U.S. Cl.
CPC ................ *D01F 1/07* (2013.01); *B01F 25/23* (2022.01); *D01F 2/08* (2013.01); *D06M 13/322* (2013.01);
(Continued)

(58) Field of Classification Search
CPC .......... D01F 1/07; D01F 2/08; D06M 13/322; D06M 2101/06; D06M 2200/30; B01F 25/23; B01F 2101/2805
See application file for complete search history.

(56) References Cited

U.S. PATENT DOCUMENTS 2,909,446 A 10/1959 Redfarn et al.
3,236,676 A 2/1966 Coates et al.
(Continued)

FOREIGN PATENT DOCUMENTS

AT 510909 A1 7/2012
CA 1020168 A 11/1977
(Continued)

OTHER PUBLICATIONS

International Search Report corresponding to International Application No. PCT/EP2018/079227 (2 pages).
(Continued)

*Primary Examiner* — Cephia D Toomer
(74) *Attorney, Agent, or Firm* — Venable LLP

(57) ABSTRACT

A process for the production of an oxidized polymer from a tetrakis hydroxyalkyl phosphonium compound comprising $NH_3$ or at least one nitrogen compound comprising at least one $NH_2$ or at least two NH groups, or $NH_3$, comprising the steps of: (a) reacting at least one tetrakis hydroxyalkyl phosphonium compound with $NH_3$ or at least one nitrogen compound in order to obtain a precondensate, wherein the molar ratio of the tetrakis hydroxyakyl phosphonium compound to the nitrogen compound is in the range of 1: (0.05 to 2.0), preferably in the range of 1: (0.5 to 1.5), particularly preferably in the range of 1: (0,65 to 1.2), (b) crosslinking the precondensate obtained in process step (a) with the aid of ammonia to form a crosslinked polymer, (c) oxidizing the crosslinked polymer obtained in step (b) by adding an oxidizing agent to the oxidized polymer, wherein, in step (b),
(Continued)

Figure 1:
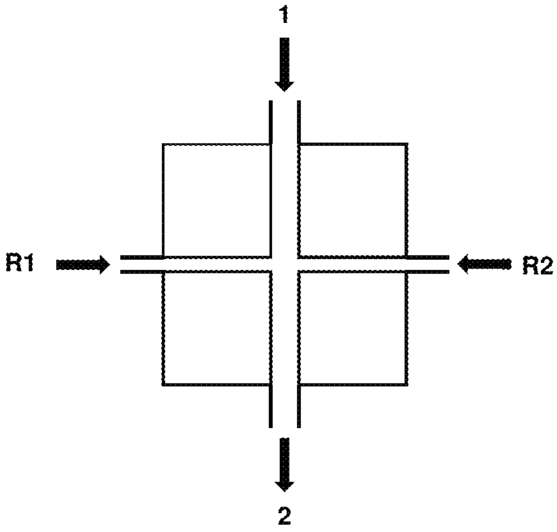

the precondensate from step (a) and the ammonia are each injected by means of a nozzle into a reactor space enclosed by a reactor housing onto a common collision point.

11 Claims, 1 Drawing Sheet

(51) Int. Cl.

| | |
|---|---|
| ***D01F 2/08*** | (2006.01) |
| ***D06M 13/322*** | (2006.01) |
| *B01F 101/00* | (2022.01) |
| *D06M 101/06* | (2006.01) |

(52) U.S. Cl.

CPC . *B01F 2101/2805* (2022.01); *D06M 2101/06* (2013.01); *D06M 2200/30* (2013.01)

(56) References Cited

U.S. PATENT DOCUMENTS

| | | | |
|---|---|---|---|
| 3,266,918 | A | 8/1966 | Schappel et al. |
| 3,455,713 | A | 7/1969 | Godfrey |
| 3,505,087 | A | 4/1970 | Godfrey |
| 3,532,526 | A | 10/1970 | Godfrey |
| 3,619,223 | A | 11/1971 | Brower et al. |
| 3,645,936 | A | 2/1972 | Gardner |
| 3,845,167 | A | 10/1974 | Franko-Filipasic et al. |
| 3,947,276 | A | 3/1976 | Siclari et al. |
| 3,957,927 | A | 5/1976 | Wurmb et al. |
| 3,985,834 | A | 10/1976 | Kao |
| 3,986,882 | A | 10/1976 | Franko-Filipasic et al. |
| 3,990,900 | A | 11/1976 | Franko-Filipasic et al. |
| 3,994,996 | A | 11/1976 | Franko-Filipasic et al. |
| 4,040,843 | A | 8/1977 | Franko-Filipasic et al. |
| 4,062,687 | A | 12/1977 | Mauric et al. |
| 4,063,883 | A | 12/1977 | Hupfl et al. |
| 4,083,833 | A | 4/1978 | Siclari et al. |
| 4,111,701 | A | 9/1978 | Franko-Filipasic et al. |
| 4,193,805 | A | 3/1980 | Mauric et al. |
| 4,220,472 | A | 9/1980 | Mauric et al. |
| 4,242,138 | A | 12/1980 | Mauric et al. |
| 4,311,855 | A | 1/1982 | Cole et al. |
| 4,543,409 | A | 9/1985 | Diamantoglou et al. |
| 4,571,310 | A | 2/1986 | Tanino et al. |
| 4,806,620 | A | 2/1989 | Klett et al. |
| 5,238,464 | A | 8/1993 | Johnson et al. |
| 5,417,752 | A | 5/1995 | Paren et al. |
| 5,690,874 | A | 11/1997 | Bell et al. |
| 6,130,327 | A | 10/2000 | Wolf et al. |
| 6,423,251 | B1 | 7/2002 | Blount |
| 6,893,492 | B2 | 5/2005 | White et al. |
| 7,837,916 | B2 | 11/2010 | Paren et al. |
| 8,500,956 | B2 | 8/2013 | Sixta et al. |
| 9,988,743 | B2 | 6/2018 | Ruf et al. |
| 10,577,723 | B2 | 3/2020 | Ruf et al. |
| 2004/0126555 | A1 | 7/2004 | Hartmann et al. |
| 2005/0025962 | A1 | 2/2005 | Zhu et al. |
| 2008/0032128 | A1 | 2/2008 | Schmidtbauer et al. |
| 2008/0093767 | A1 | 4/2008 | Paren et al. |
| 2008/0233821 | A1 | 9/2008 | Ruf et al. |
| 2009/0321025 | A1 | 12/2009 | Weightman et al. |
| 2010/0019213 | A1 | 1/2010 | Tian et al. |
| 2010/0190402 | A1 | 7/2010 | Tozzi-Spadoni et al. |
| 2012/0156486 | A1 | 6/2012 | Bisjak et al. |
| 2012/0177919 | A1 | 7/2012 | Kroner |
| 2013/0337715 | A1 | 12/2013 | Ruf et al. |
| 2020/0149192 | A1 | 5/2020 | Ruf et al. |

FOREIGN PATENT DOCUMENTS

| | | | | |
|---|---|---|---|---|
| DE | 7040 A | 11/1970 | | |
| DE | 2429254 A1 | 1/1975 | | |
| DE | 2451802 A1 | 5/1975 | | |
| DE | 2622569 A1 | 12/1976 | | |
| DE | 4128638 A1 | 3/1992 | | |
| DE | 10 2005 062 608 A1 | 7/2007 | | |
| EP | 0 619 848 B1 | 1/1999 | | |
| EP | 1165224 B1 | 1/2002 | | |
| EP | 0836634 B1 | 10/2002 | | |
| EP | 1 918 431 A1 | 5/2008 | | |
| EP | 1 753 900 B1 | 11/2008 | | |
| EP | 2473657 B1 | 4/2014 | | |
| GB | 1464545 A | 2/1977 | | |
| GB | 1468799 A | 3/1977 | | |
| GB | 1487937 A | 10/1977 | | |
| GB | 1521404 | 8/1978 | | |
| JP | 50046920 A | 4/1975 | | |
| JP | 51136914 A | 11/1976 | | |
| KR | 20090025979 | 8/2012 | | |
| WO | 93/12173 A1 | 5/1993 | | |
| WO | WO-9426962 A1 | 11/1994 | * | D01F 11/02 |
| WO | 96/05356 A1 | 2/1996 | | |
| WO | 97/02315 A1 | 1/1997 | | |
| WO | 2007/022552 A1 | 3/2007 | | |

OTHER PUBLICATIONS

Horrocks, A. R. and Kandola, B. K.: "Flame retardant cellulosic textiles" in Spec. Publ.-R. Soc. Chem. Band 224 (1998) pp. 343-362.

"Testing Methods viscose, modal, lyocell and acetate staple fibres and tows," BISFA, 2004 ed. (69 pages).

K. Bredereck and F. Hermanutz, "Man-made cellulosics," Rev. Prog. Color, 35, pp. 59-75 (2005).

* cited by examiner

FLAME RETARDANT CELLULOSIC MAN-MADE FIBERS

The present application is a national-stage entry under 35 U.S.C. § 371 of International Patent Application No. PCT/EP2018/079227, published as WO 2019/081617 A1, filed Oct. 25, 2018, which claims priority to EP 17198949.4, filed Oct. 27, 2017, the entire disclosure of each of which is hereby incorporated by reference.

The present invention relates to a process for the production of an oxidized polymer from a tetrakis hydroxyalkyl phosphonium compound comprising at least one nitrogen compound, comprising the steps of: reacting at least one tetrakis hydroxyalkyl phosphonium compound with at least one nitrogen compound to obtain a precondensate, wherein the molar ratio of the tetrakis hydroxyalkyl phosphonium compound to the nitrogen compound is in the range of 1:(0.05 to 2.0), preferably in the range of 1:(0.5 to 1.5), particularly preferably in the range of 1:(0.65 to 1.2); crosslinking the previously obtained precondensate with the aid of ammonia to form a crosslinked polymer; and oxidizing the previously obtained crosslinked polymer by adding an oxidizing agent to the oxidized polymer. Furthermore, the invention relates to a process for the production of flame retardant cellulosic man-made products from a spinning dope, which comprises providing a polymer from a tetrakis hydroxyalkyl phosphonium compound and mixing it with a cellulose-based spinning dope. Finally, the invention relates to flame retardant cellulosic man-made products.

BACKGROUND OF THE INVENTION

Fibers made of regenerated cellulose, including the man-made fibers viscose, modal, cupro or Lyocell, are sometimes provided with flame retardancy. Various known methods exist for this purpose, wherein a distinction is made, on the one hand, according to the type of the application of flame retardancy—applying the flame retardant substance to the surface of the fiber or introducing the flame retardant compound into the fiber during the wet spinning process—and, on the other hand, according to the compound responsible for flame retardancy.

Phosphorus compounds are very often used as compounds responsible for flame retardancy.

For cellulosic man-made fibers produced according to the viscose process, a large number of those substances have been suggested as flame retardant additives for incorporation into the fiber during fiber production.

In U.S. Pat. No. 3,266,918 tris (2,3-bromopropyl) phosphate is proposed as a flame retardant. Such fibers were produced industrially for some time, but the production was discontinued due to the toxicity of the flame retardant.

The substance class of substituted phosphazenes is one that is used as a flame retardant. On the basis of those substances, a flame retardant viscose fiber was also produced industrially (U.S. Pat. No. 3,455,713). However, the flame retardant is liquid, can be spun into viscose fibers only with a low yield (approx. 75% by weight), and tends to migrate out of the fiber, thereby giving the fiber undesirable stickiness.

Similar compounds have been described in patents but have never been tested for viscose fibers on an industrial scale (GB 1,521,404; U.S. Pat. Nos. 2,909,446, 3,986,882; JP 50046920; DE 2,429,254; GB 1,464,545; U.S. Pat. Nos. 3,985,834; 4,083,833; 4,040,843; 4,111,701; 3,990,900; 3,994,996; 3,845,167; 3,532,526; 3,505,087; 3,957,927). All those substances are liquid and likewise exhibit the disadvantages as described in U.S. Pat. No. 3,455,713.

In addition to the above-mentioned tris (2,3-bromopropyl) phosphate, a number of other phosphoric and phosphonic acid esters and, respectively, amides have been described as flame retardants for viscose fibers (DE 2 451 802; DE 2 622 569; U.S. Pat. Nos. 4,193,805; 4,242,138; JP 51-136914; DE 4 128 638).

From this substance class, so far, only the compound 2,2'-oxybis [5,5-dimethyl-1,3,2-dioxaphosphorinane] 2,2'-disulphide has met the requirements regarding quantitative yield in the viscose spinning process, efficacy (required amount of spinning to pass EN ISO 15025:2002) and industrial washing (EP 2 473 657). The flame-resistant fibers produced from a combination of said flame retardant with the viscose spinning process thus constitute the commercially most successful flame retardant cellulosic man-made product.

The use of 2,2'-oxybis [5,5-dimethyl-1,3,2-dioxaphosphorinane] 2,2'-disulphide in the Lyocell process for the production of flame retardant cellulosic man-made fibers fails due to the fact that it has a high yield loss, which not only has economically adverse effects, but above all is incompatible with the closed-loop systems characteristic of this process.

In a number of patent applications, possible ways of imparting flame retardant properties also to cellulose fibers produced according to the Lyocell process have been described.

WO 93/12173 describes phosphorus-containing triazine compounds as flame retardants for synthetic materials, in particular polyurethane foam. In particular, cellulose which has been spun from a solution in a tertiary amine oxide is mentioned, without giving an example with regard to the actual suitability of the compounds as flame retardants for cellulose.

EP 0 836 634 describes the incorporation of phosphorus-containing compounds as flame retardants for regenerated cellulose fibers, in particular Lyocell fibers. As an example, 1,4-diisobutyl-2,3,5,6-tetrahydroxy-1,4-dioxophosphorinan is mentioned. The method has the disadvantage that the incorporation yield of the flame retardant is only 90% and, therefore, it is unsuitable for the Lyocell process.

In WO 96/05356, Lyocell fibers are treated with phosphoric acid and urea and kept at 150° C. for 45 minutes. However, condensation reactions on the fiber level drastically impair the fiber properties, since they cause embrittlement of the fiber material.

WO 94/26962 describes the addition of a tetrakis hydroxymethyl phosphonium chloride (THPC) urea precondensate to the moist fiber prior to drying, ammonia treatment, condensation, oxidation and drying after another washing. The process as described also severely impairs the mechanical properties of the fibers.

In AT 510 909 A1, cellulosic man-made fibers with permanent flame retardant properties are described, wherein the flame retardant property is obtained in that an oxidized condensate from a salt of THP with an amino group or, respectively, $NH_3$ is added to the spinning dope. The fiber obtained has a maximum tensile force in the conditioned state of more than 18 cN/tex, and incorporation yields of more than 99% are achieved. The production process according to AT 510 909 A1 comprises a three-stage process for preparing the oxidized condensate from a salt of THP with an amino group or, respectively, $NH_3$: First, a tetrakis hydroxyalkyl phosphonium compound is reacted with the nitrogen compound, and a precondensate is obtained. This is followed by crosslinking the previously obtained precondensate with the aid of ammonia, and finally the oxidation of the phosphorus contained in the crosslinked polymer is effected by adding an oxidizing agent in order to obtain the flame retardant.

According to AT 510 909 A1, the flame retardant initially arises in the form of coarse particles. In order to achieve a particle size which can be incorporated into the spinning process for fiber production, the polymer must be subjected to wet grinding. As a rule, particle sizes of approx. 2 μm ($d_{99}$) are necessary for ensuring a stable spinning process and for obtaining therefrom a textile fiber with acceptable mechanical properties. Due to the softness of the polymer, this wet grinding step is very time and energy consuming and thus uneconomical. Ultimately, the costs of grinding exceed raw material costs. For this reason, a successful commercialization of a Lyocell fiber which is inherently flame retardant due to the incorporation of said flame retardant has been avoided to this day.

SUMMARY OF THE INVENTION

The costs for the production of textile fibers with a wet-ground flame retardant according to AT 510 909 A1 are very high, and yet the mechanical properties of those fibers are not optimal. Therefore, the object of the present invention is to provide an oxidized condensate of THP with a compound comprising an $NH_2$ radical or NH radicals or comprising $NH_3$, for which the generation of the desired particle size is less costly and which provides fibers with better mechanical properties.

Said object is achieved by a process comprising the steps of:

(a) reacting at least one tetrakis hydroxyalkyl phosphonium compound with $NH_3$ or with at least one nitrogen compound comprising at least one $NH_2$ or at least two NH groups, preferably selected from the group of urea, thiourea, biuret, melamine, ethylene urea, guanidine and dicyandiamide, in order to obtain a precondensate, wherein the molar ratio of the tetrakis hydroxyalkyl phosphonium compound to the nitrogen compound is in the range of 1:(0.05 to 2.0), preferably in the range of 1: (0.5 to 1.5), particularly preferably in the range of 1: (0,65 to 1.2), (b) crosslinking the precondensate obtained in process step (a) with the aid of ammonia, (c) oxidizing the crosslinked polymer obtained in step (b) by adding an oxidizing agent to obtain the flame retardant which is characterized in that, in step (b), the precondensate from step (a) and the ammonia are each injected by means of a nozzle into a reactor space enclosed by a reactor housing onto a common collision point.

In one embodiment it is provided that in step (b), the precondensate from step (a) and the ammonia are each injected by means of a nozzle into a reactor space enclosed by a reactor housing onto a common collision point, wherein the resulting products are removed from the reactor housing through another opening (2) by means of negative pressure on the product and gas outlet side.

In an alternative embodiment thereto it is provided that in step (b), the precondensate from step (a) and the ammonia are each injected by means of a nozzle into a reactor space enclosed by a reactor housing onto a common collision point, wherein a gas, an evaporating liquid, a cooling liquid or a cooling gas is introduced via an opening into the reactor space for maintaining the gas atmosphere in the interior of the reactor, in particular at the collision point of the jets of liquid, or, respectively, for cooling the resulting products, wherein the resulting products and excess gas are removed from the reactor housing through another opening by means of overpressure on the gas inlet side or by means of negative pressure on the product and gas outlet side (see also FIG. 1).

Surprisingly, it has been found that, by applying microjet reactor technology, the reaction of the precondensate with ammonia can be accelerated to such a strong extent that the precipitation of the crosslinked reaction product occurs already at the collision point of the micro jets, which contain, on the one hand, the precondensate and, on the other hand, the ammonia. Due to the high speed of the micro jets, the two educts are mixed at the collision point so intensely and the reaction rate of crosslinking is accelerated to such a strong extent that the flame retardant polymer will accrue directly as a nano/micro dispersion in solid form. The complex and therefore very expensive wet grinding can thus be avoided. With regard to a precise description of such a reactor and further details, EP 1 165 224 B1 can be pointed out.

The hydroxyalkyl groups of the tetrakis hydroxyalkyl phosphonium compounds are preferably hydroxymethyl, hydroxyethyl, hydroxypropyl or hydroxybutyl groups so that, in this case, the alkyl radical of the tetrakis hydroxyalkyl phosphonium compound is selected from the group of methyl, ethyl, propyl or butyl. Furthermore, the tetrakis hydroxyalkyl phosphonium compounds are preferably salts.

The at least one tetrakis hydroxyalkyl phosphonium compound is particularly preferably a tetrakis hydroxymethyl phosphonium compound (THP) having the general formula $(P^+(CH_2OH)_4)_tX^-$, or else mixtures of such compounds, wherein $X^-$ is an anion and t denotes the valence of said anion. In this case, t can denote an integer from 1 to 3. Suitable anions $X^-$ are, for example, sulfate, hydrogen sulfate, phosphate, mono- or dihydrogen phosphate, acetate or halogen anions, such as fluoride, chloride and bromide.

The at least one nitrogen compound, which is reacted with the tetrakis hydroxyalkyl phosphonium compound in process steps (a) and (b), generally constitutes one compound, two compounds, three compounds or several compounds selected from the group of ammonia, urea, thiourea, biuret, melamine, ethylene urea, guanidine and dicyandiamide. According to a preferred embodiment of the invention, the nitrogen compound is urea. According to a particularly preferred embodiment of the invention, in process step (a), at least one nitrogen compound selected from the group of urea, thiourea, biuret, melamine, ethylene urea, guanidine and dicyandiamide is reacted and crosslinked with ammonia in the subsequent process step (b).

According to a preferred embodiment of the invention, the reaction in process step (a) is performed in a solvent. The solvent used preferably is water. The content of the compounds to be reacted in process step (a) can vary over wide ranges and generally amounts to 10% by weight to 90% by weight, preferably 20% by weight to 40% by weight, based on the total mass of the reaction batch used in process step (a), which contains at least the two compounds to be reacted and the solvent.

The molar ratio of the tetrakis hydroxyalkyl phosphonium compound to the nitrogen compound can vary over wide ranges and is generally in the range of 1: (0.05 to 2.0), preferably 1:(0.5 to 1.5), particularly preferably 1:(0.65 to 1.2). By specifically selecting said molar ratio, it is ensured that the flame retardant produced according to the invention will not dissolve or will dissolve only to a small extent in the solvents used for the production of flame-protected cellulose fibers.

Process step (a) is generally carried out at a temperature ranging from 40 to 120° C., preferably at a temperature ranging from 80 to 100° C., for a period of 1 to 10 hours, preferably for a period of 2 to 6 hours.

According to an advantageous embodiment of the invention, one or more dispersants is/are added to the polymer after process step (a) has been carried out and before process step (b) is performed, and thus before crosslinking is effected by means of ammonia. Those dispersants are preferably selected from the group of polyvinylpyrrolidone, C14-C17 alkyl sulfonates, hydroxypropyl cellulose (HPC), and polyethylene glycol (PEG), modified polycarboxylate such as, e.g., etherified or esterfied polycarboxylate, in particular polycarboxylate ether (PCE). In doing so, the dispersant serves to stabilize the components of the composition and prevents the precipitating polymers from agglomerating in the subsequent crosslinking reaction in process step (b). Furthermore, the addition of very fine particulate solids such as nanocrystalline cellulose or nanoparticulate barium sulfate as agglomeration inhibitors is possible as well. Usually, the dispersant or, respectively, the spacer is used at a concentration ranging from 0.01% by weight to 3% by weight, e.g. ranging from 1% by weight to 2% by weight, based on the reaction batch, Surprisingly, it has been found that, for example, polycarboxylate ether is sufficient in a smaller amount than, for example, polyvinylpyrrolidone.

The crosslinking of the precondensate obtained in process step (a) with the aid of ammonia to form a crosslinked polymer, as provided in step (b), takes place in such a way that, on the one hand, the precondensate (precondensate stream) and, on the other hand, ammonia (ammonia stream) are provided as liquid media and sprayed onto the collision point (FIG. 1). In the case of the precondensate, the liquid medium is preferably an aqueous solution of the precondensate. Optionally, a suspension or a colloid may also be provided. The solvent used preferably for ammonia is water. The content of precondensate in the precondensate stream in process step (b) can vary over wide ranges and generally amounts to 5% by weight to 50% by weight, preferably 8% by weight to 30% by weight, particularly preferably 9% by weight to 20%, based on the total mass of the aqueous solution.

The ratio of ammonia stream: precondensate stream is controlled such that ammonia is metered at a molar ratio to the tetrakis hydroxymethyl phosphonium compound in the range of (1.0 to 4.0): 1, preferably in the range of (1.2 to 3.5): 1, particularly preferably in the range of (1.2 to 2.5): 1. According to a preferred embodiment of the invention, ammonia is metered, in this case, in such a way that the obtained dispersion at the outlet has a pH ranging from 7 to 10, preferably from 8 to 9.

For example, the precondensate and the ammonia can be injected into the reactor space in step (b) at a pressure of 10 bar or above, e.g., more than 50 bar, but in any case not more than 4,000 bar.

Step (c) can be carried out either in the reaction space of step (b) or in a separate reactor space.

It is preferably provided that the oxidation of the crosslinked polymer obtained in step (b) takes place outside of the reaction space of step (b). For example, the reaction may occur in a conventional reactor with the aid of an oxidizing agent.

In selected cases, the oxidation may occur in the reaction space of step (b), as described above. In this case, it might be provided, for example, that the oxidation is combined with the crosslinking step by introducing, for example, $O_3$ (ozone) or $O_2$ via the gas stream, which is forced into the reactor space onto the collision point.

The oxidation in process step (c) can be carried out with the aid of conventional oxidizing agents such as hydrogen peroxide, ammonium peroxodisulfate, oxygen, air (oxygen) or perchloric acid. The molar ratio between the precursor of the flame retardant and the oxidizing agent is generally about 1:1 to 1:1.2.

Figure 2:
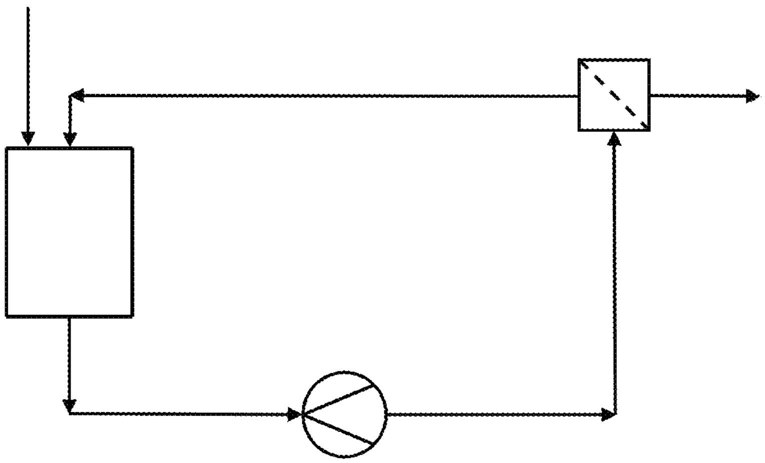

Furthermore, a process step (d) may be provided according to which soluble reaction products are separated after the oxidation according to step (c). In this way, the flame retardant can be separated from dissolved impurities via the permeate stream using methods known to a person skilled in the art, for example, by means of filtration, preferably by tangential flow filtration (cross-flow filtration) or diafiltration, and concentrated via the retentate stream (FIG. 2).

According to one embodiment, an acid may additionally be used in process step (d) to remove undesirable by-products, such as oligomers and basic compounds, even more selectively. The acid used is generally selected from the group of HCl, $H_2SO_4$, $H_3PO_4$ and acetic acid. The acid is generally used in a solvent selected from the group of water, methanol, ethanol or other solvents known to a person skilled in the art or a mixture thereof, while being diluted to a concentration of about 1 to 75%, preferably to a concentration of about 1 to 20%, particularly preferably to a concentration of about 1 to 9%. The solvent used preferably for diluting the acid is water. The amount of acid used for purifying the flame retardant obtained upon process step (c) can vary over wide ranges. In general, one volume fraction of flame retardant is used with one volume fraction of acid, according to a preferred embodiment, a double volume fraction of acid is used, according to a particularly preferred embodiment, a triple volume is used.

Subsequently, the flame retardant obtained upon process step (d) can be washed once or several times with a solvent, wherein, for washing, a single up to a double volume of solvent, based on the volume of the flame retardant, is used so that the washing is free from acid. This is done by mixing the flame retardant obtained upon process step (d) with a solvent and subsequently performing a tangential flow filtration (cross-flow filtration) or diafiltration. Preferably, water is used for washing. Optionally, the washing is initially performed with water to a pH of 7, and, at the end, with N-methylmorpholine-N-oxide.

Optionally, prior to the exchange of water for N-methylmorpholine-N-oxide, a thickening step may be carried out, which is effected by mechanical processes known to a person skilled in the art (e.g., centrifugation) or by thermal processes (e.g., evaporation).

Subsequently, the incorporation of the concentrated flame retardant into fibers or, respectively, fiber materials, occurs, for example, in the course of the Lyocell process or the viscose process or the cupro process or according to methods in which ionic liquids are used as dissolution media for the cellulose.

Therefore, the invention relates, in addition, to a process for the production of flame retardant cellulosic man-made fibers from a spinning dope, which comprises providing a polymer from a tetrakis hydroxyalkyl phosphonium compound produced in the aforementioned manner and mixing it with a cellulose-based spinning dope, wherein the polymer from a tetrakis hydroxyalkyl phosphonium compound in the form of an aqueous dispersion is present in an amount of 5% by weight to 50% by weight, based on the cellulose, spinning the spinning dope through a spinneret into a spinning bath, whereby filaments are formed, drawing the filaments, precipitating the filaments and aftertreatment by washing, bleaching and finishing.

The filaments may be continuous multifilaments or staple fibers. In case of staple fibers, a step of cutting the filaments into staple fibers is provided after the precipitation of the filaments.

Furthermore, one aspect of the invention relates to cellulosic man-made products comprising a flame retardant comprising an oxidized polymer from a tetrakis hydroxyalkyl phosphonium compound with at least one nitrogen compound comprising at least one $NH_2$ or at least two NH groups, or $NH_3$ with a particle size $d_{99}$ of <1.8, preferably <1.7, particularly preferably <1 μm. Particle sizes $d_{99}$ down to 0.9 μm are conceivable. Preferably, it is provided that this is a textile fiber having a fineness of >=0.9 dtex up to <=3.

The cellulosic man-made product may be, for example, a film, a powder, a nonwoven or a fibrid. For example, the nonwovens may be meltblown nonwovens according to the Lyocell or cupro process.

The inventors have discovered that, according to the invention, a particle size $d_{99}$ of <1.8 preferably <1.7, most preferably <1 μm can be achieved with the method described above. In the wet grinding process, such particle sizes are not achievable at commercially acceptable costs, the limit for this is a $d_{99}$ of 2 μm or above.

Preferably, the spinning dope is a solution of cellulose in an aqueous tertiary amine oxide.

DETAILED DESCRIPTION OF THE INVENTION

In the following scheme I, an example of the synthesis of the oxidized polymer from a tetrakis hydroxyalkyl phosphonium compound with urea is illustrated. A person skilled in the art knows that this is only one of several stoichiometrically possible compositions of the final crosslinked precondensate.

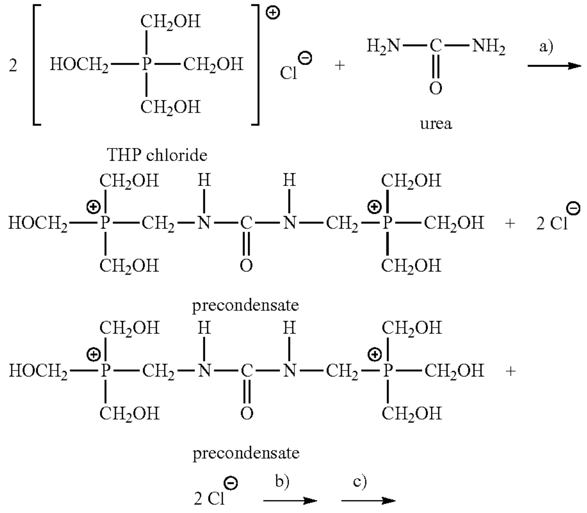

-continued

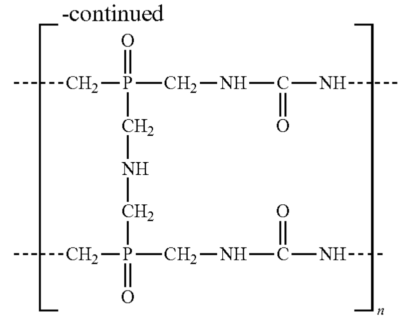

crosslinked precondensate

In the first step, tetrakis hydroxymethyl phosphonium chloride is reacted with urea in step (a) to form a precondensate. Subsequently, step (b) is carried out in a microjet reactor by reacting the precondensate with the aid of ammonia to form a crosslinked polymer. In doing so, ammonia and the precondensate are each injected separately from each other in an aqueous solution into a reactor space enclosed by a reactor housing onto a common collision point by means of a nozzle. In an embodiment variant, a cooling gas is introduced into the reactor space via an opening to maintain the gas atmosphere in the interior of the reactor. The resulting products and excess gas are removed through a further opening from the reactor housing by means of overpressure on the gas inlet side or by means of negative pressure on the gas outlet side. The alternative embodiment provides that no cooling gas is introduced into the reactor space, and resulting products are removed from the reactor housing through an opening by means of negative pressure on the gas outlet side.

According to a preferred embodiment, step (c) takes place outside of the microjet reactor, with $H_2O_2$ being added to the oxidized polymer as an oxidizing agent.

FIG. 1 schematically shows step (b) of the process in a reactor.

FIG. 2 schematically shows step (d) of the process.

In FIG. 1, a reactor housing with a reactor space is shown, wherein the precondensate R1 from step (a) is introduced laterally into the reactor space. Ammonia R2 is also introduced into the reactor space, whereby the precondensate R1 and the ammonia R2 meet at a collision point. For discharging the reaction products, a gas can be introduced via an opening 1, which exits with the reaction product on the gas outlet side 2. It has also been shown that the precondensate R1 and the ammonia R2 are brought to a collision point without a carrier gas being introduced via the opening 1. In such a configuration, the reactor housing can be operated for gas with the reactor space and a closed opening 1. The reaction product can then be removed via the gas outlet side 2 by means of negative pressure.

FIG. 2 shows the purification step (d), wherein, initially, the reaction product from step (c) is introduced as a feed 11 into a storage tank 12. Via the pump 16, it is purified across a membrane 14, e.g., by tangential flow filtration. The retentate 13 is returned into the storage tank 12. The permeate 15 is discharged.

Example 1: Production of a Flame Retardant Dispersion Using a Microjet Reactor (MJR) and Subsequent Spinning of Flame Retardant Fibers According to the Viscose Process The production of the precondensate is performed analogously to AT 510 909 A1, wherein tetrakis hydroxymethyl phosphonium chloride (THPC) is used as the starting component for the reaction with urea instead of tetrakis hydroxymethyl phosphonium sulfate.

The crosslinking of the obtained precondensate with ammonia is subsequently carried out in a microjet reactor. To this end, the obtained precondensate as a 10 wt % solution is continuously metered as a precondensate stream onto position R1 of the MJR at a pressure of 11 bar, upon addition of 12% by weight of polyvinylpyrrolidone (Duralkan INK 30), based on the precondensate. As an ammonia stream, an ammonia solution of 1.5% by weight is continuously metered at position R2 at a pressure of 11 bar. The reaction product emerging at the product or, respectively, gas outlet side 2 is collected, mixed with $H_2O_2$ and stirred for 30 min at a temperature not higher than 40° C., wherein the molar ratio between the precursor of the flame retardant (precondensate) and the oxidizing agent is 1:1. A suspension with a solids content of oxidized, crosslinked precondensate of 4.9% is obtained. The particle size $d_{99}$ is 1.79 μm.

The oxidized, crosslinked precondensate is subsequently purified by tangential flow filtration (FIG. 2) and concentrated. For this purpose, 12.3 kg of suspension is filled into the storage tank and processed for 4 cycles across a polyethersulfone membrane (150 kDa and 0.6 $m^2$ filter area) at a pressure of 2 bar. After cycles 1 to 3, it is, in each case, diluted with deionized water so that the initial weight in the storage tank is 12.3 kg. After 4 cycles over a total duration of 2.5 hours, 4.3 kg of suspension with a solids content of 14.7% is obtained.

The suspension produced is particularly suitable for the production of flame retardant cellulosic moulded bodies.

The proportion of the flame retardant in the cellulosic man-made fiber, in the form of a viscose or Lyocell fiber, can be between 5% by weight and 50% by weight, preferably between 10% by weight and 30% by weight, particularly preferably between 15% by weight and 25% by weight, based on the fiber. If the proportion is too low, the flame-retardant effect will be insufficient, and if the proportions exceed a recommended limit, the mechanical properties of the fiber will deteriorate excessively. With those proportions, a flame retardant cellulosic man-made fiber can be obtained which is characterized in that the strength in the conditioned state ranges from 18 cN/tex to 50 cN/tex.

From a beech pulp (R18=97.5%), a viscose having the composition 6.0% cellulose/6.5% NaOH was produced, wherein 40% of CS2 was used. A modifier (2% dimethylamine and 1% polyethylene glycol 2000, in each case based on cellulose) and 22%, based on cellulose, of the flame retardant in the form of the 14.7% dispersion were added to the viscose with a spinning gamma value of 62 and a viscosity of 120 falling ball seconds. The mixed viscose was spun into a spinning bath having the composition 72 g/l sulfuric acid, 120 g/l sodium sulfate and 60 g/l zinc sulfate at a temperature of 38° C. with 60 μm nozzles, was drawn to 120% in a secondary bath (water at 95° C.) and was pulled off with 42 m/min. The aftertreatment (hot diluted $H_2SO_4$/water/desulphurisation/water/bleaching/water/finishing) was performed according to known methods. A fiber with a titre of 2.19 dtex, a strength (conditioned) of 21.2 cN/tex and a maximum tensile elongation (conditioned) of 12.4% was obtained.

Example 2: Production of a Flame Retardant Dispersion Using a Microjet Reactor (MJR) and Subsequent Spinning of Flame Retardant Fibers According to the Lyocell Process The production of the precondensate is performed analogously to AT 510 909 A1, wherein tetrakis hydroxymethyl phosphonium chloride (THPC) is used as the starting component for the reaction with urea instead of tetrakis hydroxymethyl phosphonium sulfate.

The crosslinking of the obtained precondensate with ammonia is subsequently carried out in a microjet reactor. To this end, the obtained precondensate as a 10 wt % solution is continuously metered as a precondensate stream onto position R1 of the MJR at a pressure of 11 bar, upon addition of 5% by weight of an esterified polycarboxylate (Viscocrete P-510), based on the precondensate. As an ammonia stream, an ammonia solution of 1.5% by weight is continuously metered at position R2 at a pressure of 11 bar. The reaction product emerging at the product or, respectively, gas outlet side 2 is collected, mixed with $H_2O_2$ and stirred for 30 min at a temperature not higher than 40° C., wherein the molar ratio between the precursor of the flame retardant (precondensate) and the oxidizing agent is 1:1. A suspension with a solids content of oxidized, crosslinked precondensate of 5.3% is obtained. The particle size $d_{99}$ is 1.71 μm.

The oxidized, crosslinked precondensate is subsequently purified by tangential flow filtration (FIG. 2) and concentrated. For this purpose, 12.3 kg of suspension is filled into the storage tank and processed for 4 cycles across a polyethersulfone membrane (150 kDa and 0.6 $m^2$ filter area) at a pressure of 2 bar. After cycles 1 to 3, it is, in each case, diluted with deionized water so that the initial weight in the storage tank is 12.3 kg. After 4 cycles over a total duration of 2.5 hours, 4.3 kg of suspension with a solids content of 16% is obtained.

The suspension produced is particularly suitable for the production of flame retardant cellulosic moulded bodies.

The proportion of the flame retardant in the cellulosic man-made fiber, in the form of a viscose or Lyocell fiber, can be between 5% by weight and 50% by weight, preferably between 10% by weight and 30% by weight, particularly preferably between 15% by weight and 25% by weight, based on the fiber. If the proportion is too low, the flame-retardant effect will be insufficient, and if the proportions exceed a recommended limit, the mechanical properties of the fiber will deteriorate excessively. With those proportions, a flame retardant cellulosic man-made fiber can be obtained which is characterized in that the strength in the conditioned state ranges from 18 cN/tex to 50 cN/tex. 22%, based on cellulose, of the flame retardant in the form of the 16% dispersion was added to the slurry (mixture of pulp/aqueous NMMO) and water was evaporated to produce a fiber-free spinning solution having the composition 12% cellulose/77% NMMO/11% water. A sulphate high-alpha pulp was used as the pulp.

According to the established wet-dry spinning process, the spinning dope was spun at a spinning temperature of 110° C. into a spinning bath containing 25% NMMO having a temperature of 20° C. to form 2.2 dtex fibers, with the aid of a 100 μm nozzle. Fibers with a strength (conditioned) of 35.0 cN/tex and a maximum tensile elongation (conditioned) of 13.3% were obtained.

What is claimed is:

1. A process for the production of an oxidized polymer from a tetrakis hydroxyalkyl phosphonium compound comprising $NH_3$ or at least one nitrogen compound comprising at least one $NH_2$ or at least two NH groups, or $NH_3$, comprising the steps of:

(a) reacting at least one tetrakis hydroxyalkyl phosphonium compound with $NH_3$ or at least one nitrogen compound in order to obtain a precondensate, wherein the molar ratio of the tetrakis hydroxyalkyl phosphonium compound to the nitrogen compound in the range of 1:(0.05 to 2.0), (b) crosslinking the precondensate obtained in process step (a) with the aid of ammonia to form a crosslinked polymer, (c) oxidizing the crosslinked polymer obtained in step (b) by adding an oxidizing agent to the oxidized polymer wherein, in step (b), the precondensate from step (a) and the ammonia are each injected by means of a nozzle into a reactor space enclosed by a reactor housing onto a common collision point to form the crosslinked polymer, wherein the crosslinked polymer has a $d_{99}$ particle size of less than 1.8 μm.

2. The process according to claim 1, wherein, in step (b), the precondensate from step (a) and the ammonia are each injected by means of a nozzle into a reactor space enclosed by a reactor housing onto a common collision point, wherein the resulting products are removed from the reactor housing through an opening by means of negative pressure on the product and gas outlet side.

3. The process according to claim 1, wherein, in step (b), the precondensate from step (a) and the ammonia are each injected by means of a nozzle into a reactor space enclosed by a reactor housing onto a common collision point, wherein a gas, an evaporating liquid, a cooling liquid or a cooling gas is introduced via an opening into the reactor space for maintaining the gas atmosphere in the interior of the reactor, in particular at the collision point of the jets of liquid, or, respectively, for cooling the resulting products, wherein the resulting products and excess gas are removed from the reactor housing through another opening by means of overpressure on the gas inlet side.

4. The process according to claim 1, wherein the nitrogen compound is selected from the group of urea, thiourea, biuret, melamine, ethylene urea, guanidine and dicyandiamide.

5. The process according to claim 1, wherein, in step (b), on the one hand, the precondensate and, on the other hand, ammonia are provided as liquid media and sprayed onto the collision point.

6. The process according to claim 5, wherein, in the case of the precondensate, the liquid medium is an aqueous solution, and, in the case of ammonia, the liquid medium is an aqueous solution.

7. The process according to claim 1, wherein soluble reaction products are separated after the oxidation according to step (c).

8. The process according to claim 1, wherein the alkyl radical of the tetrakis hydroxyalkyl phosphonium compound comprises methyl, ethyl, propyl or butyl.

9. The process according to claim 1, wherein the molar ratio of the tetrakis hydroxyalkyl phosphonium compound to the nitrogen compound is in the range of 1:(0.5 to 1.5).

10. The process according to claim 9, wherein the molar ratio of the tetrakis hydroxyalkyl phosphonium compound to the nitrogen compound is in the range of 1:(0.65 to 1.2).

11. The process according to claim 7, wherein the soluble reaction products are separated after the oxidation according to step (c) by means of tangential flow filtration.

* * * * *